April 14, 1942.   J. N. PAQUIN   2,279,519
PACKLESS VALVE
Filed Aug. 8, 1940
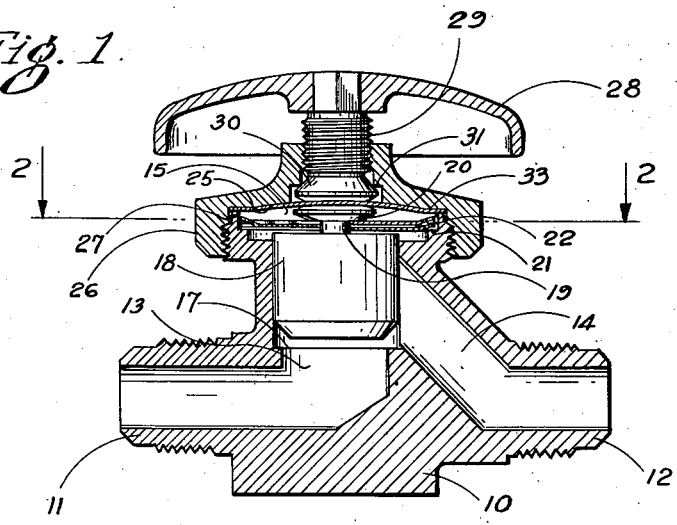
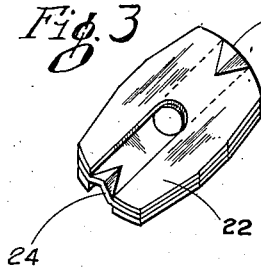
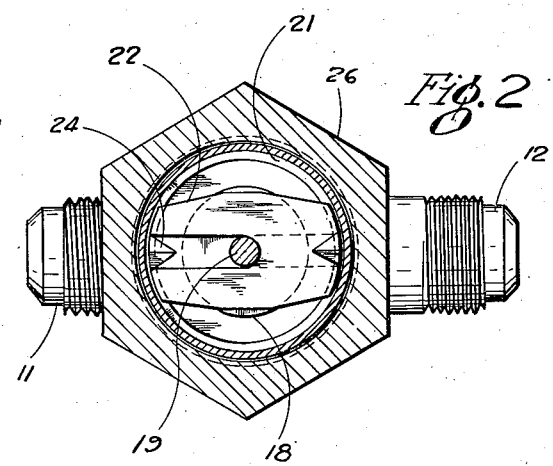
INVENTOR.
JOSEPH NORMAN PAQUIN
BY
ATTORNEYS.

Patented Apr. 14, 1942

2,279,519

UNITED STATES PATENT OFFICE 2,279,519

PACKLESS VALVE

Joseph Norman Paquin, Euclid, Ohio, assignor to The Weatherhead Company, Cleveland, Ohio, a corporation of Ohio Application August 8, 1940, Serial No. 351,861

3 Claims. (Cl. 251—31)

This invention relates broadly to valves and more specifically to improvements in packless valves employed in connection with high pressure gases of the type used in refrigeration systems and the like.

Heretofore in packless valves of the type used in connection with high pressure gases the elastic metallic diaphragm has been disposed in intimate engagement with the enlarged end of a conical valve plug for actuating the valve plug to either its closed or open position. Often a coil spring encircling the valve plug or a second diaphragm surrounding the base of the valve plug is employed for raising the valve to its open position. In these devices the diaphragms are ordinarily subjected to flexing in opposite directions for opening and closing the valve, thus requiring a reverse bending action which weakens the diaphragms to such an extent that their life is shortened and the durability and reliability of the valves impaired.

Because of the comparatively short life of the diaphragms in service, various schemes have been proposed to permit the diaphragms to be changed while the valve remains in service. The present invention relates to a simplified valve structure arranged in such a manner that the life of the diaphragm embodied therein is materially increased, thus the necessity of replacing the diaphragm while the valve is in service is substantially eliminated. To this end the present invention is directed to a plug valve disposed within a valve casing and having a reduced stem and head formed thereon with an elastic metallic diaphragm extending over the head and secured between the valve casing and a bonnet. The diaphragm is so arranged that it bends in only one direction, that is, to only one side of its normal position so that it is never subject to a reverse bend, thus less strain is imposed thereon, which insures a longer life for the diaphragm.

Furthermore, in the present construction the bonnet has a plug threaded therein which has an enlarged end portion adapted to engage the metallic diaphragm and head of the plug valve to seat the valve plug against the resistance of a plurality of bifurcated leaf springs. Also the valve of the present disclosure is so designed that the enlarged portion formed on the threaded plug is disposed upon a valve seat in the bonnet to cooperate with the diaphragm in providing for a positive pressure seal when the plug valve is in its raised position.

One of the objects, therefore, of the present invention is to provide a valve having a plurality of seats therein, one of which is adapted to be engaged by the head of a valve actuating plug for preventing the escape of fluid from said valve during the use thereof. Another object of the invention is to provide in a valve casing a plug valve formed with a reduced stem and a head thereon and having a plurality of leaf springs interposed between said casing and stem and engaging the head for urging the plug valve to an open position. Another object of the invention is to provide a valve that is sturdy of structure, economic of manufacture, leak proof and quick acting.

Other objects and advantages more or less ancillary to the foregoing and the manner in which all the various objects are realized will appear in the following description, which considered in connection with the accompanying drawing, sets forth the preferred embodiment of the invention.

Referring to the drawing wherein the preferred embodiment of the invention is illustrated, Fig. 1 is a vertical section of the valve embodied in the present invention showing the leaf springs retaining the plug valve in its open position; Fig. 2 is a sectional view of the valve showing the bifurcated leaf springs supported on a ledge within the valve casing, the section being taken on a plane indicated by line 2—2 of Fig. 1; and Fig. 3 is a perspective view of the bifurcated leaf springs.

Referring to Fig. 1, the valve casing 10 comprises an integrally formed body having axially aligned inlet and outlet ports 11 and 12 communicating through passageways 13 and 14 with a chamber 15 within the casing. A valve seat 17 formed at the end of the inlet passageway 13 is adapted to have the tapered end of a plug valve 18 seated thereon. The plug valve has formed integrally therewith a reduced stem 19 which has a head or disc 20 provided on the end thereof.

The valve casing 10 is counter bored contiguous its upper end to produce a ledge 21 within the chamber 15. Disposed within the chamber 15 there are a plurality of bifurcated leaf springs 22, preferably three or more, which have their bifurcated ends telescopically engaging the reduced stem 19 so as to position the stem within the central portion of the springs while the ends of the springs are supported on the ledge 21. As shown in Fig. 3, the end of the spring 22 opposite the bifurcated end has a small triangular shaped portion 24 pressed upwardly therein, which is disposed between the bifurcated end of the adjacent spring to prevent the springs from moving with respect to each other. In placing the springs within the chamber 15 the bifurcated ends of adjacent springs extend in opposite directions, that is, the bifurcated ends of the first and third springs extend in the same direction while the bifurcated end of the second spring projects in the opposite direction. This arrangement of the springs provides for the opening in the center thereof through which the reduced stem 19 projects.

The chamber 15 is sealed against the escape of fluid therefrom by a highly resilient metallic diaphragm 25, formed preferably of beryllium copper, which extends over the head or disc 20 and rests upon the upper end of the valve casing 10. A bonnet 26 is screw threaded on the periphery of the valve casing 10 and engages the diaphragm 25. As the bonnet is threaded upon the valve casing the outer edge of the metallic diaphragm is compressed against the narrow annular seat 27 on the edge of the casing, which provides for a metal to metal leak proof seal between the valve casing, diaphragm and bonnet.

The valve is operated by a hand wheel 28 which has affixed thereto a plug 29 that is threaded within the bonnet 26 in axial alignment with the plug valve 18. The plug 29 has a head 30 formed on the free end thereof which is adapted to engage a valve seat 31 formed in the bonnet for sealing the chamber 15 when the plug valve 18 is in its raised position.

In assembling the packless valve the bifurcated ends of the leaf springs 22 are telescopically engaged with the reduced stem 19 after which the plug valve 18 and springs are inserted within the valve casing 10. The metallic diaphragm 25 is then placed over the head or disc 20 and supported on the edge 27 of the valve casing 10. The bonnet 26 with the hand wheel 28 and plug affixed therein is then threaded upon the valve casing for compressing the diaphragm between the valve casing and bonnet for sealing the chamber 15.

The valve is particularly useful in refrigerating systems or on gas bottles or in any service where a loss of fluid may be either costly or dangerous. Upon the rotation of the hand wheel 28 in a counter clockwise direction the plug 29 will be retracted from the bonnet 26 allowing the head 30 to engage the seat formed in the bonnet. The retraction of the plug 29 permits the leaf springs 22 to raise the plug valve 18 from its seat 17 by urging the head or disc 20 upwardly, which allows the fluid to flow from the inlet port 11 through the passageways 13 and 14 and thence to the outlet port 12. The upward movement of the plug valve 18 resulting from the pressure of the fluid within the passageway 13 and the resiliency of the springs 22 causes the head 20 to move upward as the diaphragm 25 moves toward the position shown in the drawing.

As shown in Fig. 1, the inner face 33 of the bonnet 26 is shaped to conform to the contour of the diaphragm 25 in its normal or raised position. When the plug valve 18 is unseated the upward movement of the diaphragm is limited by its engagement with the face 33. This not only prevents excessive flexing of the diaphragm but tends to distribute over its entire surface thereof the force that is applied thereto by the disc or head 20.

In operation of refrigeration systems it is sometimes necessary to clean and adjust the high side flow or inlet valve for the evaporator, during which time the valve in the refrigerating line must be closed. The rotation of the hand wheel 28 in a clockwise direction causes the head 30 on the threaded plug 29 to engage the opposite side of that portion of the diaphragm 25 which is supported on the head 20 for moving the plug valve 18 to its closed position.

With the valve in its full open position the constant pressure of the head 20 against the metallic diaphragm 25 eliminates all detrimental effects of compressor pulsation on the diaphragm. When the valve is in its closed position the metallic diaphragm is substantially flat and is never deflected so that the center of the diaphragm is below its periphery, thus avoiding a reverse flexing of the diaphragm and the impairment of its resilient characteristics. The over all height of the valve in the present disclosure is materially reduced by the use of the flat leaf springs which enables the valve to be constructed as a compact unit at a very low cost. Furthermore, the compactness of the valve is of considerable advantage in that very little space is necessary for the installation thereof.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In a valve embodying a casing having a chamber therein with ports communicating therewith, a bonnet and a resilient diaphragm held at its periphery between said casing and bonnet, the combination of an axially movable plug valve slidable on walls of the chamber and engageable at one end with a seat in said chamber, said plug valve having at the other end a reduced stem with an enlarged head thereon engageable with said diaphragm, a flat, generally rectangular metal spring, comprising a plurality of bifurcated laminations, supported at its ends on said casing and embracing said stem and engaging said head, and means in said bonnet to depress said diaphragm and spring and seat said plug valve.

2. In a valve embodying a casing and a bonnet with a chamber in said casing having ports communicating therewith, the combination of an axially movable plug valve slidable on walls of the chamber and engageable at one end with a seat in said chamber, said plug valve having at the other end a reduced stem with an enlarged head thereon, a flat, generally rectangular metal spring comprising a plurality of bifurcated laminations supported at its ends on said casing with the bifurcated portions of adjacent laminations extending in opposite directions and defining an opening for the reception of said stem, said spring engageable with said head for raising the plug valve within the chamber and means in said bonnet to depress said spring and seat said plug valve.

3. In a valve embodying a casing and a bonnet with a chamber in said casing having ports communicating therewith, the combination of an axially movable plug valve slidable on walls of the chamber and engageable at one end with a seat in said chamber, said plug valve having at the other end a reduced stem with an enlarged head thereon, a flat, generally rectangular metal spring comprising a plurality of bifurcated laminations supported at its ends on said casing with the bifurcated portions of adjacent laminations extending in opposite directions and telescopically embracing said stem and engaging said head, an upwardly extending projection formed on the several laminations coaxial with the bifurcated portions, said projections extending into the bifurcated portion of the superjacent lamination to restrain the laminations from swinging movement with respect to each other and means in said bonnet to depress said spring and seat said plug valve.

JOSEPH NORMAN PAQUIN.